J. B. SPITZ.
VARIABLE SPEED TRANSMISSION MECHANISM.
APPLICATION FILED MAY 3, 1915. RENEWED DEC. 4, 1917.

1,270,562.

Patented June 25, 1918.
2 SHEETS—SHEET 1.

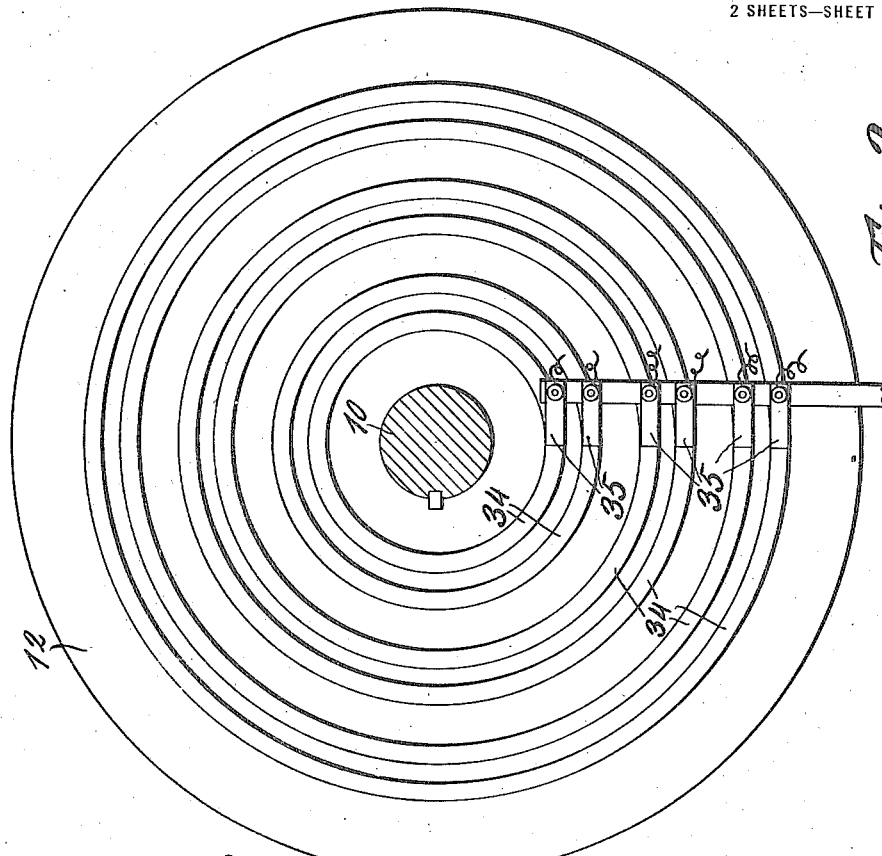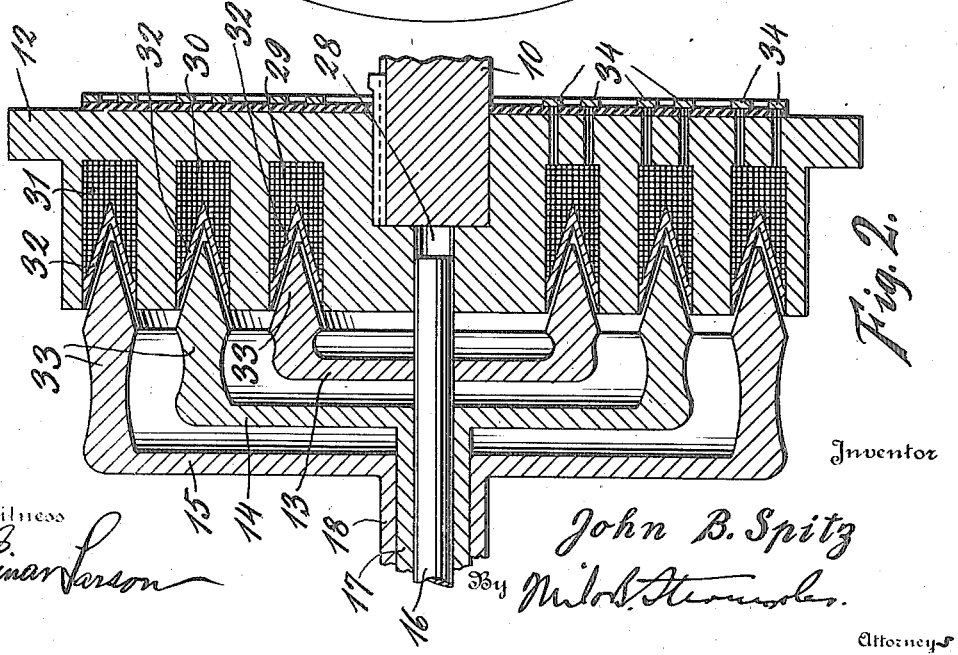

UNITED STATES PATENT OFFICE.

JOHN B. SPITZ, OF ELGIN, ILLINOIS, ASSIGNOR OF ONE-FOURTH TO WALTER G. ROYER AND THREE-EIGHTHS TO REUBEN G. ROYER, BOTH OF ELGIN, ILLINOIS.

VARIABLE-SPEED-TRANSMISSION MECHANISM.

1,270,562.      Specification of Letters Patent.      Patented June 25, 1918.

Application filed May 3, 1915, Serial No. 25,643. Renewed December 4, 1917. Serial No. 205,433.

*To all whom it may concern:*

Be it known that I, JOHN B. SPITZ, a citizen of the United States, residing at Elgin, in the county of Kane and State of Illinois, have invented certain new and useful Improvements in Variable-Speed-Transmission Mechanisms, of which the following is a specification.

This invention relates to mechanism for transmitting motion, and more particularly one which transmits motion at variable speeds.

The invention has for its object to provide a novel and improved driving clutch member and a series of coöperating driven clutch members, together with a novel and improved gearing between the driven clutch members and the shaft or other part to be driven, for transmitting motion to the latter at different speeds.

The objects stated are attained by means of a combination and arrangement of parts to be hereinafter described and claimed, reference being had to the accompanying drawings in which—

Fig. 2 is a vertical section of the clutch on the line 2—2 of Fig. 1, and

Fig. 3 is a rear face view of one of the clutch members.

Figure 1:
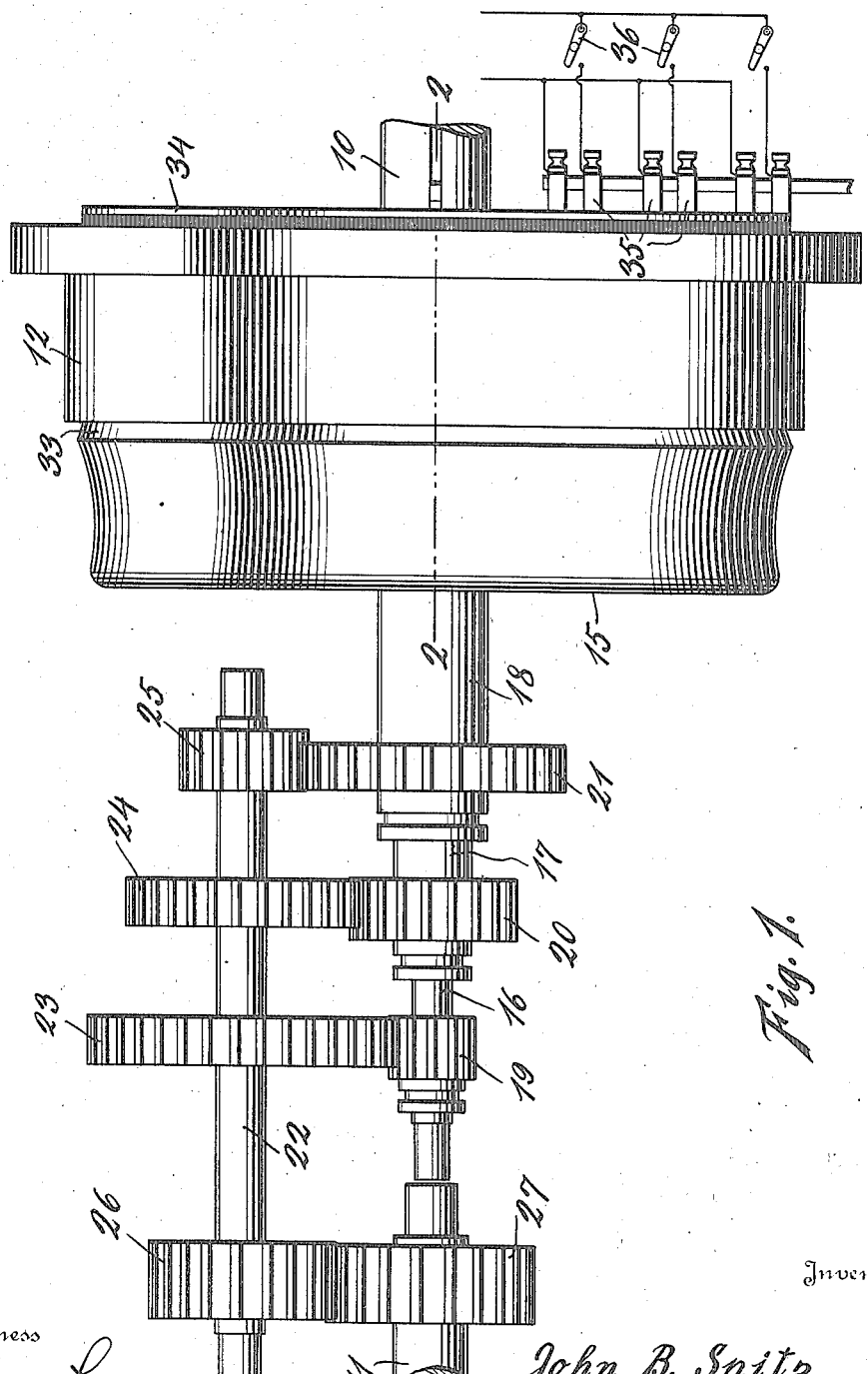
Figure 1 is a side elevation of the mechanism.

Referring specifically to the drawings, 10 denotes a drive shaft from which motion is to be transmitted to a shaft 11 at a variable speed. On the shaft 10 is fast a clutch member 12, and associated with said clutch member is a series of coöperating clutch members, which latter members are independently operable and transmit motion to the driven shaft 11 at different speeds. Provision is made for three different speeds, which, however, may be varied as desired. The driven clutch members are indicated at 13, 14 and 15, respectively. The member 13 is fast on a shaft 16, the member 14 is fast on a shaft 17, and the member 15 is fast in a shaft 18. The shaft 16 is solid and is slidably mounted on the shaft 17 the latter being hollow. The shaft 18 is also hollow and incloses the shaft 17. The shafts therefore telescope, and they are independently rotatable and also slidable in the direction of their length. On the shaft 16 is keyed or otherwise made fast a pinion 19; the shaft 17 has a fast pinion 20, and the shaft 18 has a fast pinion 21. Alongside these shafts is located a countershaft 22 having made fast thereto pinions 23, 24 and 25, respectively. The pinion 23 is in mesh with the pinion 19, the pinion 24 meshes with the pinion 20, and the pinion 25 is in mesh with the pinion 21. The respective pairs of meshing pinions are properly proportioned to transmit motion to the shaft 22 at different speeds. The motion of the shaft 22 is transmitted to the shaft 11 through meshing pinions 26 and 27 fast on the shafts.

The clutch member 12 is a magnet, the body of which is a disk which is keyed or otherwise made fast to the drive shaft 10. The disk also has a central opening 28 in which one end of the shaft 16 loosely seats. The disk has on one side three concentric annular grooves to receive magnet coils 29, 30 and 31, respectively, whereby three electro-magnets are had, the armatures of which are the clutch members 13, 14 and 15. The magnets are adapted to be independently energized and when any one of the magnets is energized, the corresponding armature is attracted to establish a driving connection between the shaft 10 and the shaft which carries the attracted armature. Each magnet coil is held in place by a ring 32 seating in the outer end of the groove in which the coil is mounted, and closing said groove. The ring is V-shaped in cross section. The armatures 13, 14 and 15 are disks having on one side an outstanding annular flange 33 which is pointed at its outer end to enter the channels of the rings 32 produced by the V-shaped cross-section of the latter. The diameter of the flanges corresponds to the diameter of the respective rings, the flange of the armature 13 being positioned and dimensioned to enter the ring of the inner magnet, the flange of the armature 14 entering the ring of the intermediate magnet, and the flange of the armature 15 entering the ring of the outer magnet.

On the side of the disk 12, opposite the side carrying the magnet coils 29, 30 and 31, and the rings 32, are mounted collector rings 34, one pair of collector rings being provided for each coil, the respective pairs of rings being suitably connected to the coils. A pair of brushes 35 is also provided for each set of collector rings, and each pair of brushes is suitably connected to a switch 36. If the mechanism is applied to a motor vehicle, the electric current for the magnets may be taken from the magneto, or any other suitable source.

It will be evident from the foregoing that any one of the three speeds may be obtained by simply closing the switch 36 which controls the corresponding magnet. When this magnet is energized, its armature is attracted and coupled to the disk 12, whereupon the shaft which carries the armature rotates with the disk and transmits the motion to the shaft 11 through the gearing heretofore described. The pairs of pinions which transmit motion from the armature shafts to the shaft 22 are always in mesh, the longitudinal movement of the armature shafts to follow the making and breaking of their holds on the magnets not being sufficient to take said pinions out of mesh. A positive driving connection is therefore provided, and the changes of speed are effected noiselessly and without shock.

I claim:—

1. The combination of a driving clutch member having on its face a series of concentric annular channels which are V-shaped in cross-section, a series of driven clutch members having outstanding flanges on one side dimensioned and shaped to fit in the respective channels, independently rotatable and longitudinally slidable shafts carrying the respective driven clutch members, means for effecting a driving connection between the driving clutch member and the respective driven clutch members, a driven shaft, and a variable speed gearing between the shafts of the driven clutch members and the driven shaft.

2. The combination of a driving clutch member having on its face a series of concentric annular channels which are V-shaped in cross-section, a series of driven clutch members having outstanding flanges on one side dimensioned and shaped to fit in the respective channels, independently rotatable and longitudinally slidable shafts carrying the respective driven clutch members, means for effecting a driving connection between the driving clutch member and the respective driven clutch members, a driven shaft, and a permanent mesh variable speed gearing between the shafts of the driven clutch members and the driven shaft.

3. The combination of a driving clutch member having on its face a series of concentric annular channels which are V-shaped in cross-section, a series of driven clutch members having outstanding flanges on one side dimensioned and shaped to fit in the respective channels, independently rotatable and longitudinally slidable shafts carrying the respective driven clutch members, means for effecting a driving connection between the driving clutch member and the respective driven clutch members, a driven shaft, and a variable speed gearing between the shafts of the driven clutch members and the driven shaft, said gearing comprising pinions fast on the shafts of the driven clutch members, and pinions fast on the driven shaft and permanently in mesh respectively with the first mentioned pinions.

4. The combination of a driving clutch member having a series of clutch surfaces, a series of driven clutch members independently engageable respectively with said clutch surfaces, means for effecting a driving connection between the driving clutch member and the respective driven clutch members, independently rotatable shafts carrying the driven clutch members, a driven shaft, and a variable speed gearing between the shafts of the driven clutch members and the driven shaft.

5. The combination of a driving clutch member having a series of clutch surfaces, a series of driven clutch members independently engageable respectively with said clutch surfaces, means for effecting a driving connection between the driving clutch member and the respective driven clutch members, independently rotatable shafts carrying the driven clutch members, a driven shaft, and a permanent mesh variable speed gearing between the shafts of the driven clutch members and the driven shaft.

6. The combination of a driving clutch member having a series of clutch surfaces, a series of driven clutch members independently engageable respectively with said clutch surfaces, means for effecting a driving connection between the driving clutch member and the respective driven clutch members, independently rotatable shafts carrying the driven clutch members, a driven shaft, and a permanent mesh invariable speed gearing between the shafts of the driven clutch member and the driven shaft, said gearing comprising pinions fast on the shaft of the driven clutch members, and pinions fast on the driven shaft and permanently in mesh respectively with the first mentioned pinions.

7. The combination of a driving clutch member having a series of clutch surfaces, a series of driven clutch members independently engageable respectively with said clutch surfaces, means for effecting a driving connection between the driving clutch member and the respective driven clutch members, telescopically connected independently rotatable shafts carrying the driven clutch members, a driven shaft, and a variable speed gearing between the shafts of the driven clutch members and the driven shaft.

8. The combination of a driving clutch member having on its face a series of concentric annular channels which are V- shaped in cross-section, a series of driven clutch members having outstanding flanges on one side dimensioned and shaped to fit in the respective channels, independently rotatable and longitudinally slidable shafts carrying the respective driven clutch members, said shafts being telescopically connected, means for effecting a driving connection between the driving clutch member and the respective driven clutch members, a driven shaft, and a variable speed gearing between the shafts of the driven clutch members and the driven shaft.

9. The combination of a driving clutch member having on one side a series of concentric annular magnet coils, means for independently energizing the magnet coils, a series of driven clutch members having concentric annular armatures opposite the respective magnet coils, and a variable speed gearing operatively connected to the driven clutch members.

10. The combination of a driving clutch member having on one side a series of concentric annular magnet coils, means for independently energizing the magnet coils, a series of driven clutch members having concentric annular armatures opposite the respective magnet coils, independently rotatable and longitudinally slidable shafts carrying the respective driven clutch members, a driven shaft, and a variable speed gearing between the shafts of the driven clutch members and the driven shaft.

11. The combination of a driving clutch member having on one side a series of concentric annular grooves, rings closing the outer ends of the grooves, said rings being V-shaped in cross-section, magnet coils seating in the grooves, means for independently energizing the magnet coils, a series of driven clutch members having concentric annular armatures dimensioned and shaped to fit respectively in the channels formed by the rings, and a variable speed gearing operatively connected to the driven clutch members.

12. The combination of a driving clutch member having on one side a series of concentric annular grooves, rings closing the outer ends of the grooves, said rings being V-shaped in cross-section, magnet coils seating in the grooves, means for independently energizing the magnet coils, a series of driven clutch members having concentric annular armatures dimensioned and shaped to fit respectively in the channels formed by the rings, independently rotatable and longitudinally slidable shafts carrying the respective driven clutch members, a driven shaft, and a variable speed gearing between the shafts of the driven clutch members and the driven shaft.

In testimony whereof I affix my signature in presence of two witnesses.

JOHN B. SPITZ.

Witnesses:
W. W. Fraser,
R. G. Royer.